No. 742,924. PATENTED NOV. 3, 1903.
C. W. STEVENS.
MANUFACTURE OF ARTIFICIAL STONE.
APPLICATION FILED MAR. 16, 1901.
NO MODEL.
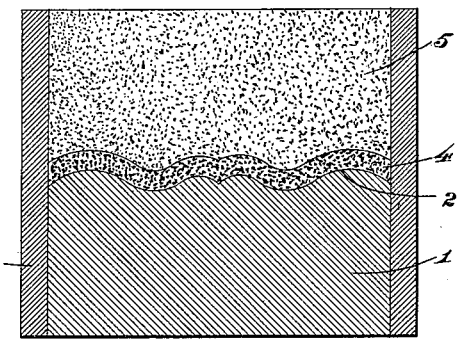
Fig. I.
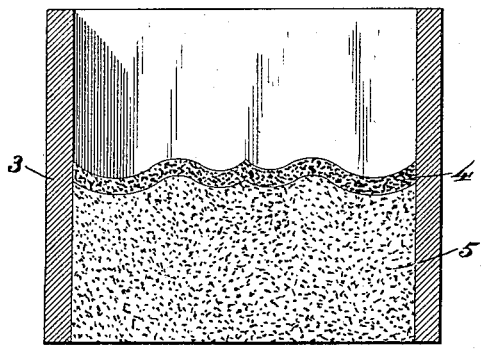
Fig. II.
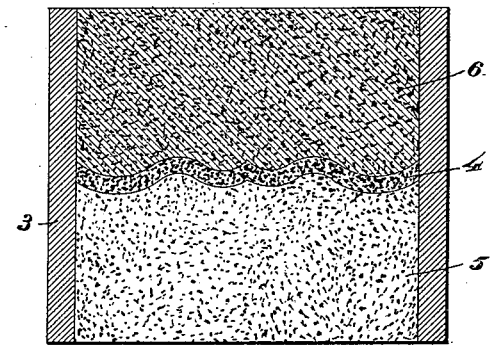
Fig. III.
Fig. IV.
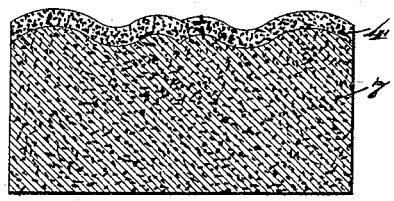
WITNESSES:
H. S. Austin.
INVENTOR:
Charles W. Stevens,
BY Joseph R. Atkins,
Attorney.

No. 742,924. Patented November 3, 1903.

UNITED STATES PATENT OFFICE.

CHARLES W. STEVENS, OF HARVEY, ILLINOIS.

MANUFACTURE OF ARTIFICIAL STONE.

SPECIFICATION forming part of Letters Patent No. 742,924, dated November 3, 1903.

Application filed March 16, 1901. Serial No. 51,515. (No model.)

*To all whom it may concern:*

Be it known that I, CHARLES W. STEVENS, of Harvey, in the county of Cook, State of Illinois, have invented certain new and useful Improvements in the Manufacture of Artificial Stone, of which the following is a complete specification, reference being had to the accompanying drawings.

The object of my invention is to produce improvements in the manufacture of artificial stone whereby in the process of manufacture without remanipulation provision is made for hardening the face of the stone and rendering it impervious to water.

Heretofore it has been the practice in the manufacture of artificial stone to treat the face of the stone, for example, by dipping it into a hardening or waterproofing solution. This process is comparatively expensive and slow. By my process the stone is completed in one manipulation, a better result is obtained than by the old methods employed, and, moreover, a non-artificial appearance in the face of the article produced.

In carrying out my process the manufacture may be conducted on the spot where the stone is to be used, or it may be made elsewhere and prepared for shipment.

In the accompanying drawings, Figure I is a vertical section of a flask or box, showing the method of forming a mold for the practice of my process. Fig. II is a similar view showing the flask or box illustrated in Fig. I inverted and the pattern removed therefrom. Fig. III is a view similar to Fig. II, showing the stone material filled against the face of the mold. Fig. IV is a view of the stone removed, with its skin coating saturated with hardening material adhering to the face of the green stone.

In carrying out my process I take a pattern, (indicated in the drawings by the reference - numeral 1.) This pattern may be made of any suitable material—such as wood, metal, or plaster—and about the same I provide a close-fitting flask or box 3. Upon the face 2 of the pattern within the box 3 I provide a skin coating 4—that is to say, a thin layer of a specially-prepared material. The office of the coating 4 is to exhibit against the face of the stone to be manufactured a material which will produce a hardening effect upon the face of the stone when formed against it and to render the face of the stone impervious to water. I propose to employ for this purpose any material known in the art which will produce the desired effect. It is well understood in the art that various materials may be employed for this purpose; but that with which I have obtained the best results and which I prefer to employ is a mixture of limewater and saccharine matter. The proportions which I have employed to advantage are one pound of sugar to two and one-half gallons of water; but the proportions may be widely varied, as is well understood in the art. I do not desire to limit myself to the proportions to be employed for the purpose any more than I desire to limit myself to the materials to be used, but specify only those materials and proportions thereof from which in practice I have obtained good results. The hardening solution is mixed with sand, and this mixture constitutes the coating 4, applied to the face of the pattern 2. The mixture of the hardening solution with the sand constitutes also a size for the sand, so as to hold it in place and preserve the sharpness of its lines of contour, which is an advantage. In my United States Letters Patent No. 624,563, issued May 9, 1899, I set forth a process of forming artificial stone in which the face of the mold is covered with a layer of stone compound in a dry powdered state. This is done in order to preserve the fine sharp projections of the mold in place while the liquid stone material is being poured into the mold; but in consequence of the dryness of this layer, particularly in deep figures in the mold, a porosity in the face of the stone is produced on account of the dryness of the powder and its unequal absorption of moisture from the stone material. By my present invention the lines of the mold are perfectly held by the size, and the mold is reproduced in the stone of equal density throughout. Having formed the coating 4 in the manner above specified, I fill the flask 3 with loose sand 5 in a comparatively dry state. The object of filling above the coating 4 is twofold: First, it is cheaper, and, second, it affords a better absorbent for the liquid of the stone material than if the mold were sized throughout. The coating 4 is for like reason made thin in order that the water of the stone material may readily permeate it and pass into the sand backing 5. Having filled the flask with the sand 5, as specified, the mold is completed and the flask 3 is next reversed, as shown in Fig. II, and the pattern 1 removed, when, as shown in that figure, the mold, having a base 5 of sand, is presented with its sized coating 4 uppermost in the flask ready for the pouring in of the stone mixture. In Fig. III the flask is shown filled with the stone mixture, (indicated by the reference-numeral 6.) This stone mixture may be of any suitable material, comprising, for example, ground stone or sand and cement and with any preferred coloring-matter. After the flask is filled with the stone mixture, as shown in Fig. III, it is allowed to set and is then withdrawn from the mold when the skin coating 4 will remain adherent to the face of the formed stone 7, as indicated in Fig. IV of the drawings.

Although I have specified that a flask 3 is employed for containing the mold, yet for certain purposes I prefer to form the flask or its counterpart, as well as the mold, entirely of sand or other absorbent material.

The stone 7 may be left in the flask with the coating 4 upon it until it is perfectly cured, when on account of the presence of the hardening material in the coating the face of the cured stone will be found to be perfectly hardened and rendered impervious to water. I prefer, however, in order to expedite the process of curing and to obtain better results by forcing more of the hardening material into the face of the stone to dry the stone after it has set, preferably by heat, in a kiln in an atmosphere of carbonic anhydrid gas.

It is well understood in the art that the drying of stone in an atmosphere as above specified produces a beneficial effect upon the stone, the gas from the atmosphere driving into the stone and hardening it.

My process is differentiated from the ordinary process of drying stone in an atmosphere of carbonic anhydrid gas in that owing to the presence of the coating 4 upon the face of the stone the gas in passing into the stone carries with it the hardening material held in the coating 4, thereby improving the results obtained.

After the stone has been cured, either in the ordinary way or by the kiln-drying process, the residual of the coating 4 is brushed off or otherwise removed and the finished face of the stone exposed. By "residual of the coating 4" I mean such part of the original coating 4 as may remain after the hardening material which forms a part of the coating has performed its function. In brushing off the coating 4 all of the sand which constitutes a part of that coating will not be removed; but a portion remaining incorporated with the stone will constitute upon the surface thereof a natural or non-artificial finish.

What I claim is—

1. An improvement in the manufacture of artificial stone, which consists in providing a mold with a coating of hardening material, filling the mold with a stone mixture, and subjecting the stone so formed, with the coating of hardening material adherent to it, to the action of heat.

2. An improvement in the manufacture of artificial stone, which consists in providing a mold with a coating of hardening material, filling the mold with a stone mixture, and subjecting the stone so formed, with the coating of hardening material adherent to it, to the action of heat in an atmosphere of carbonic anhydrid gas.

3. An improvement in the manufacture of artificial stone, which consists in providing a mold with a coating composed of sand, lime-water, and saccharine matter, filling the mold with stone mixture, and removing the residual coating after the stone is cured.

In testimony of all which I have hereunto subscribed my name.

CHARLES W. STEVENS.

Witnesses:
CHAS. E. RIORDAN,
KARL J. DANIEL.